United States Patent
Rhodes et al.

(10) Patent No.: US 7,222,543 B2
(45) Date of Patent: May 29, 2007

(54) MODULAR ENCODER, METHOD OF PRODUCING A MODULAR ENCODER, AND SYSTEM FOR MEASURING ANGULAR MOVEMENT

(75) Inventors: Gary Rhodes, Goleta, CA (US);
Mamoru Yamashita, Kiyose (JP);
Johann Mitterreiter, Chieming (DE);
Mathias Tresenreiter, Rohrdorf (DE);
Yoshiyuki Nakamura, Kanagawa-ken (JP)

(73) Assignee: Dr. Johannes Heidenhain GmbH, Traunreut (DE)

( * ) Notice: Subject to any disclaimer, the term of this patent is extended or adjusted under 35 U.S.C. 154(b) by 19 days.

(21) Appl. No.: 10/996,253

(22) Filed: Nov. 23, 2004

(65) Prior Publication Data

US 2006/0107760 A1    May 25, 2006

(51) Int. Cl.
*G01L 3/00* (2006.01)
(52) U.S. Cl. .................................... 73/862.08
(58) Field of Classification Search ............... 73/862.08
See application file for complete search history.

(56) References Cited

U.S. PATENT DOCUMENTS

| | | | | |
|---|---|---|---|---|
| 4,654,522 | A * | 3/1987 | Gornick et al. | 250/231.18 |
| 5,057,684 | A * | 10/1991 | Service | 250/231.13 |
| 5,708,496 | A * | 1/1998 | Barnett et al. | 356/28 |
| 6,024,586 | A | 2/2000 | Kumagai | |
| 6,600,151 | B2 * | 7/2003 | Chapman et al. | 250/231.13 |
| 6,733,457 | B2 * | 5/2004 | Flesch et al. | 600/459 |
| 6,892,465 | B2 * | 5/2005 | Raab et al. | 33/503 |
| 2002/0162239 | A1 | 11/2002 | Mitterreiter et al. | |

FOREIGN PATENT DOCUMENTS

| | | |
|---|---|---|
| EP | 0 231 385 | 8/1987 |
| EP | 1 087 456 | 3/2001 |
| JP | 61-219832 | 9/1986 |
| JP | 62-36519 | 2/1987 |
| JP | 62-277521 | 12/1987 |
| JP | 4-20816 | 1/1992 |
| JP | 9-311057 | 5/1996 |
| JP | 2001 221 661 | 8/2001 |

* cited by examiner

*Primary Examiner*—Max Noori
(74) *Attorney, Agent, or Firm*—Kenyon & Kenyon LLP

(57) ABSTRACT

A modular encoder includes an encoder housing and a printed circuit board mounted in the encoder housing. The modular encoder also includes a mounting bracket adapted to electrically couple to the printed circuit board and a mounting screw adapted to couple the encoder housing to a motor and to electrically couple the mounting bracket to the motor.

10 Claims, 7 Drawing Sheets

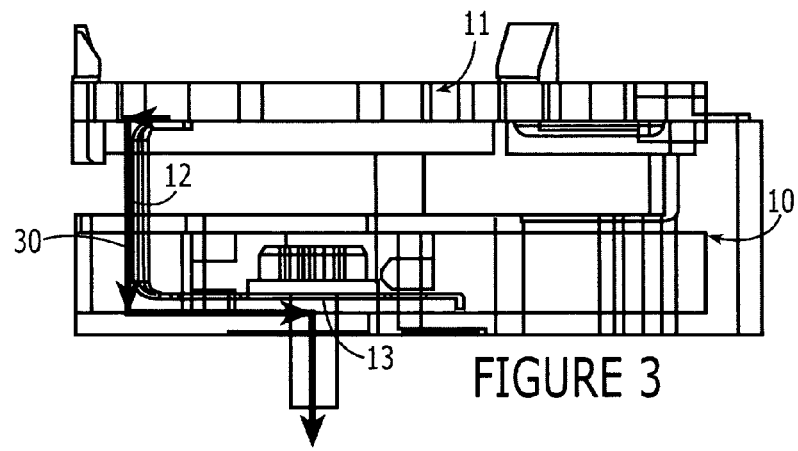
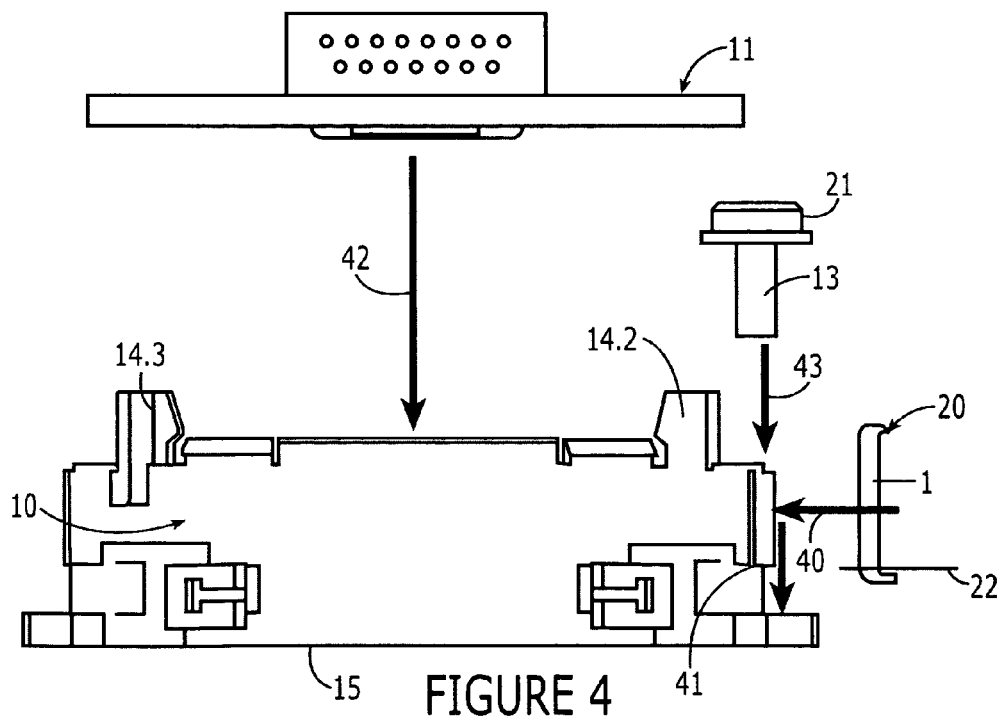

MODULAR ENCODER, METHOD OF PRODUCING A MODULAR ENCODER, AND SYSTEM FOR MEASURING ANGULAR MOVEMENT

FIELD OF THE INVENTION

The present invention relates to measuring devices. More particularly, the present invention relates to a modular encoder, a method of producing a modular encoder, and a system for measuring angular movement.

BACKGROUND INFORMATION

Encoders are used to measure angular or linear motion. A common use of encoders is for computer numeric control (CNC) machines. Encoder housings may be made of metal, e.g., in a bearing encoder, or plastic, e.g., in a modular encoder, and may include printed circuit boards (PCB).

In some situations, it may be desirable or a requirement to eliminate noise on encoder signals, e.g., due to a ground loop. This may be achieved by electrically connecting, i.e., grounding, the PCB to the motor to which the encoder is mounted. In modular encoders, the surface of the housing that contacts the motor is made of non-conductive plastic. In some situations, an O-bracket and a wire may be soldered to the PCB to create an electrical connection between the PCB and the motor. However, this may be both costly and labor intensive.

A metal encoder housing of a bearing encoder may directly electrically couple the PCB to the motor. However, metal encoders may be expensive to produce.

The plastic encoder housing of a modular encoder may be coated to provide a ground path for an enclosed PCB thereof. However, a coated plastic encoder housing may be subject to failure if the coating becomes abraded due to use and/or the coating may be expensive to produce.

A plastic encoder housing may additionally or alternatively be provided with an external wire that may be soldered to provide a ground path for the PCB. An external soldered wire may be difficult and/or expensive to produce and may also be subject to failure due to bending or stressing of the solder bond.

SUMMARY

According to an example embodiment of the present invention, a modular encoder includes an electrically non-conductive encoder housing and a printed circuit mounted in the encoder housing. The modular encoder also includes a mounting bracket adapted and arranged to electrically couple to the printed circuit board and a mounting screw adapted to couple the encoder housing to a motor and to electrically couple the mounting bracket to the motor.

The encoder housing may include a bracket assembly adapted to hold the printed circuit board against the mounting bracket. The encoder housing may include a non-conductive polymer. The mounting bracket may be metallic.

The mounting bracket may include an external tab adapted to extend outside a circumference of the encoder housing and adapted to couple to a drain wire. The mounting bracket may include a tab adapted to couple to the printed circuit board, the tab adapted to resiliently flex in response to the printed circuit board being mounted in the encoder housing.

The modular encoder may be mounted to a motor.

According to an example embodiment of the present invention, a method of producing a modular encoder includes inserting an electrically conductive mounting bracket in an electrically non-conductive encoder housing and arranging a printed circuit board on the encoder housing to electrically couple the printed circuit board to the mounting bracket. The method also includes connecting the encoder housing to a motor using an electrically conductive connector, the connector contacting the mounting bracket and the motor.

The method may further include covering the printed circuit board with a cover.

The mounting bracket may be inserted in the encoder housing during molding of the encoder housing.

The electrically conductive connector may include a metal screw. The electrically conductive mounting bracket may be metallic. The electrically conductive mounting bracket may include a metal tab adapted to couple to the printed circuit board. The electrically conductive mounting bracket may include an external tab adapted to couple to a drain wire.

According to an example embodiment of the present invention, a system for measuring angular movement includes a modular encoder including an electrically non-conductive encoder housing, a printed circuit board mounted in the encoder housing, and a mounting bracket electrically coupled to the printed circuit board. The system also includes a motor and a mounting screw coupling the modular encoder to the motor and electrically coupling the mounting bracket to the motor.

The mounting bracket may include an external tab adapted to extend to an exterior of the encoder housing. The external tab may be adapted to electrically couple to a drain wire.

The mounting bracket may include a tab adapted to couple to the printed circuit board. The tab may be adapted to resiliently flex in response to the printed circuit board being mounted in the encoder housing.

BRIEF DESCRIPTION OF THE DRAWINGS

FIG. 3 is a schematic view of an electrical path in a side view of an exemplary embodiment of the present invention.

FIG. 4 is an exploded side view of an encoder housing, a PCB, a mounting bracket, and a mounting screw showing exemplary movement directions for assembly.

DETAILED DESCRIPTION

A device and method using a stamped and formed metal bracket to electrically couple a PCB to a motor through an encoder is described. The metal bracket (also referred to herein as a mounting bracket) may be positioned or dropped into place and held in position by the PCB. The connection to the motor may be made through a mounting screw.

Figure 1:
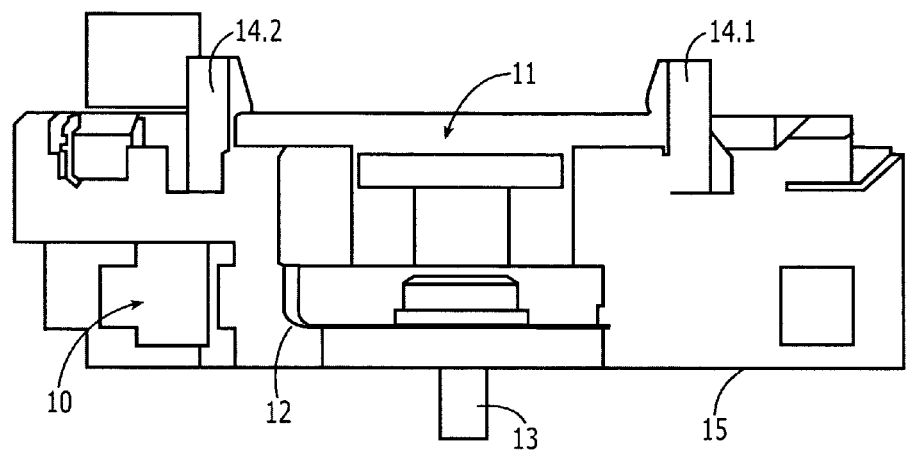
FIG. 1 is a side view of an encoder housing, a PCB, a mounting bracket, and a mounting screw according to an exemplary embodiment of the present invention.

FIG. 1 is a side view of encoder housing 10, PCB 11, mounting bracket 12, and mounting screw 13 according to an exemplary embodiment of the present invention. PCB 11 may be held in position on encoder housing 10 by clip posts 14.1 and 14.2. There may be additional clip posts, or fewer clip posts. Clip posts 14.1 and 14.2 may be integrated into encoder housing 10, which may be composed of any appropriate polymer or other electrically non-conductive material. PCB 11 may be composed of pure or doped silicon, and may include circuitry of any appropriate material or manufacture, either on the surface(s) of PCB 11 an/or internal to PCB 11. Mounting screw 13 extends below bottom surface 15 of encoder housing 10 to allow attachment to a motor.

Figure 2A:
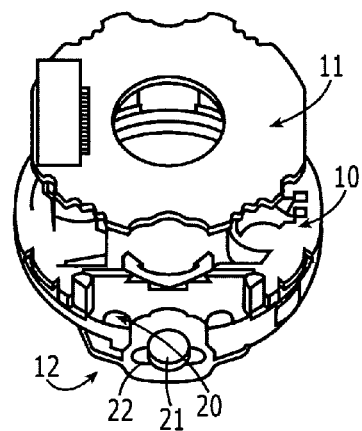
FIG. 2a is an exploded view of an exemplary embodiment of the present invention from above and to the side.

FIG. 2a illustrates from above and to the side encoder housing 10 spatially separated from, and aligned with, PCB 11. Mounting bracket 12 having tab 20 is shown positioned in encoder housing 10 so that tab 20 is exposed to PCB 11. Head 21 of mounting screw 13 is illustrated contacting washer contact area 22 of mounting bracket 12.

Figure 2B:
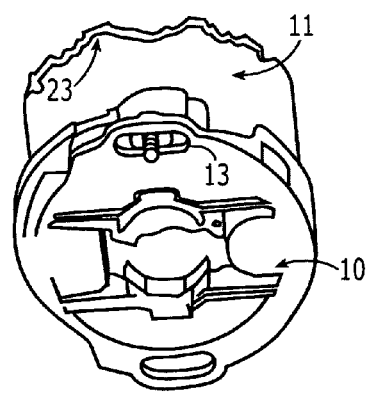
FIG. 2b is an exploded view of an exemplary embodiment of the present invention from below and to the side.

FIG. 2b illustrates from below and to the side encoder housing 10 spatially separated from, and aligned with, PCB 11. Mounting screw 13 is shown extending below encoder housing 10. PCB contact 23 is shown on a bottom side of PCB 11.

FIG. 3 is a schematic view of electrical path 30 in a side view of an exemplary embodiment of the present invention. Electrical path 30 is shown extending from PCB 11 through mounting bracket 12 positioned in encoder housing 10 to mounting screw 13.

FIG. 4 is an exploded side view of encoder housing 10, PCB 11, mounting bracket 12, and mounting screw 13. An exemplary method of manufacturing an encoder may include the steps of inserting mounting bracket 12 in the direction of arrow 40 into a slot of encoder housing 10. Mounting bracket 12 may or may not be further positioned within encoder housing 10 by moving mounting bracket 12 in the direction of arrow 41. PCB 11 may be arranged on encoder housing 10 by moving it in the direction of arrow 42. PCB 11 may be positioned under clip posts 14.2 and 14.3. Mounting screw 13 having head 21 may be moved in the direction of arrow 13 to contact washer contact area 22 of mounting bracket 12. Mounting screw 13 may extend below bottom surface 15 of encoder housing 10 to allow attachment to a motor. The manufacturing steps may be performed in a different order and/or may be eliminated completely in alternative exemplary embodiments of the present invention.

Figure 5:
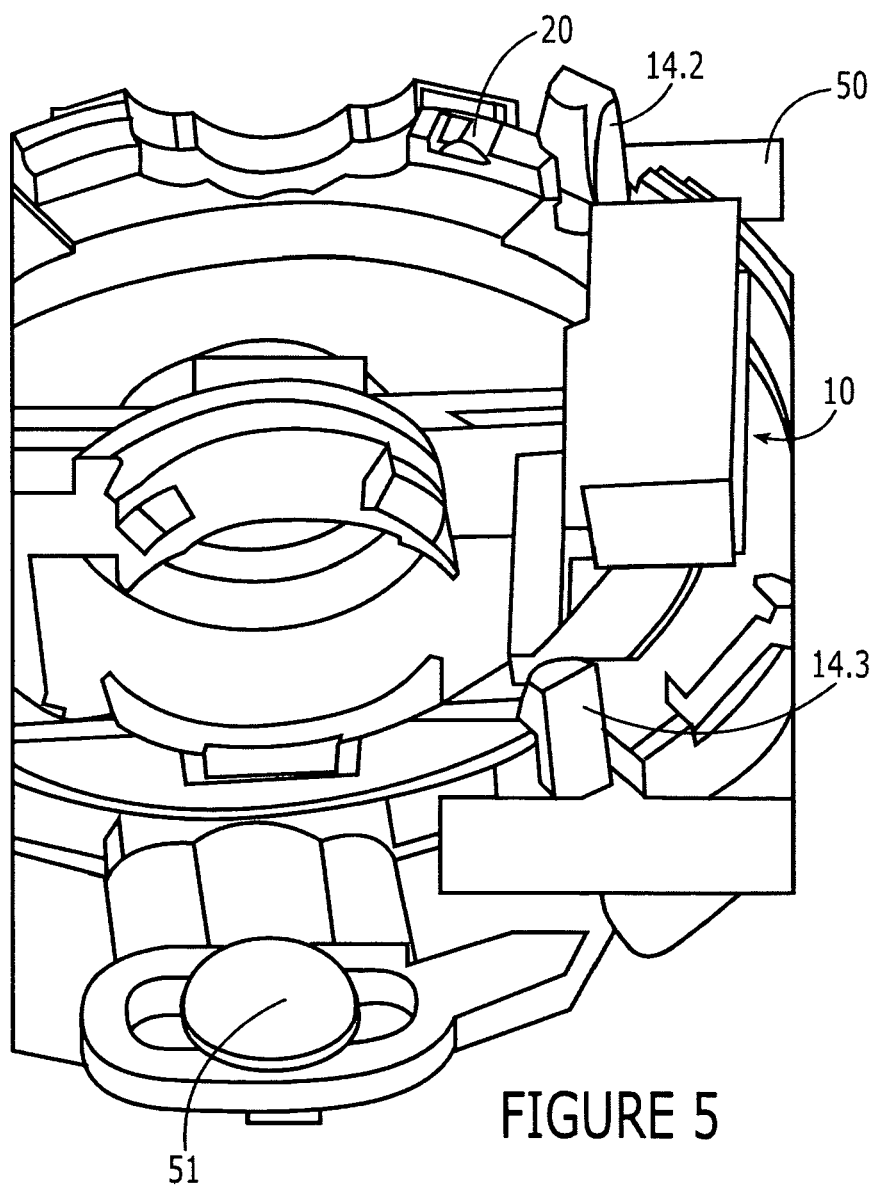
FIG. 5 is a view of an exemplary embodiment of the present invention from above and to the side.

FIG. 5 illustrates encoder housing 10 with tab 20 of mounting bracket 12 exposed to a top side. This exemplary embodiment of mounting bracket 12 includes an external tab 50, which may extend out of a slot in encoder housing 10, e.g., the same slot used to position mounting bracket 12 in encoder housing 10. External tab 50 may be adapted to be used as an attachment point for a drain wire and/or a lug, e.g., by a crimp connection, a soldered connection, a lug connection, a screw connection, etc. Also illustrated in FIG. 5 is additional mounting screw 51, which may be positioned on a side opposite to the other mounting screw. There may be any of one or more mounting screws in total.

The tab 20 of the mounting bracket 12 may be arranged to flex, e.g., resiliently flex, in response to mounting of the PCB 11 in the encoder housing 10. This flexing contact may reliably maintain stable contact between the PCB 11 and the mounting bracket 12 despite vibration to which the encoder is subjected when mounted to a motor and may permit relatively high manufacturing tolerances for the encoder housing 10 and the PCB 11.

Figure 6:
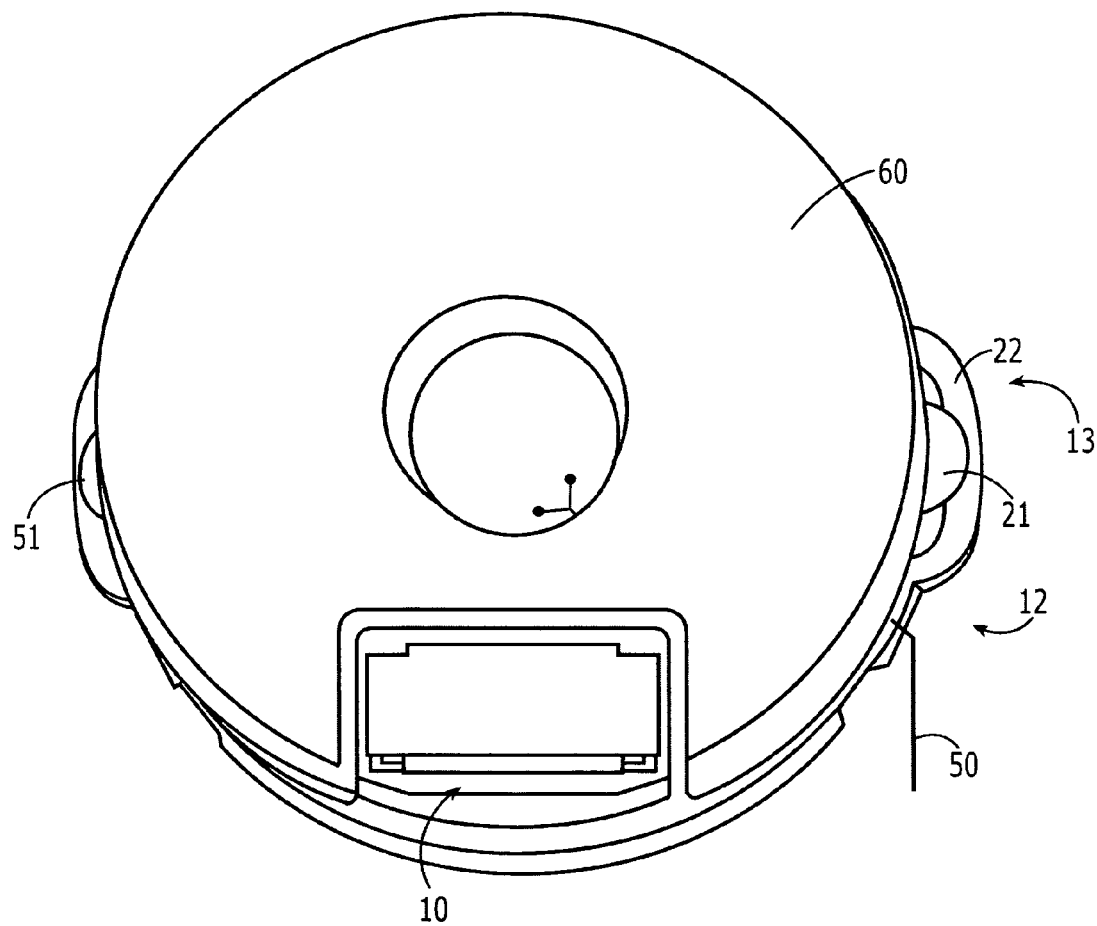
FIG. 6 is a view of an exemplary embodiment of the present invention from above.

FIG. 6 is a top view of an exemplary embodiment of the present invention. Encoder housing 10 is partially or completely covered by PCB cover 60. Mounting screw 13 holds mounting bracket 12 in place by head 21 contacting washer contact area 22. Mounting screw 13 may attach the encoder to a motor. External tab 50 extends beyond the circumference of encoder housing 10. Opposite to mounting screw 13 is additional mounting screw 51.

Figure 7:
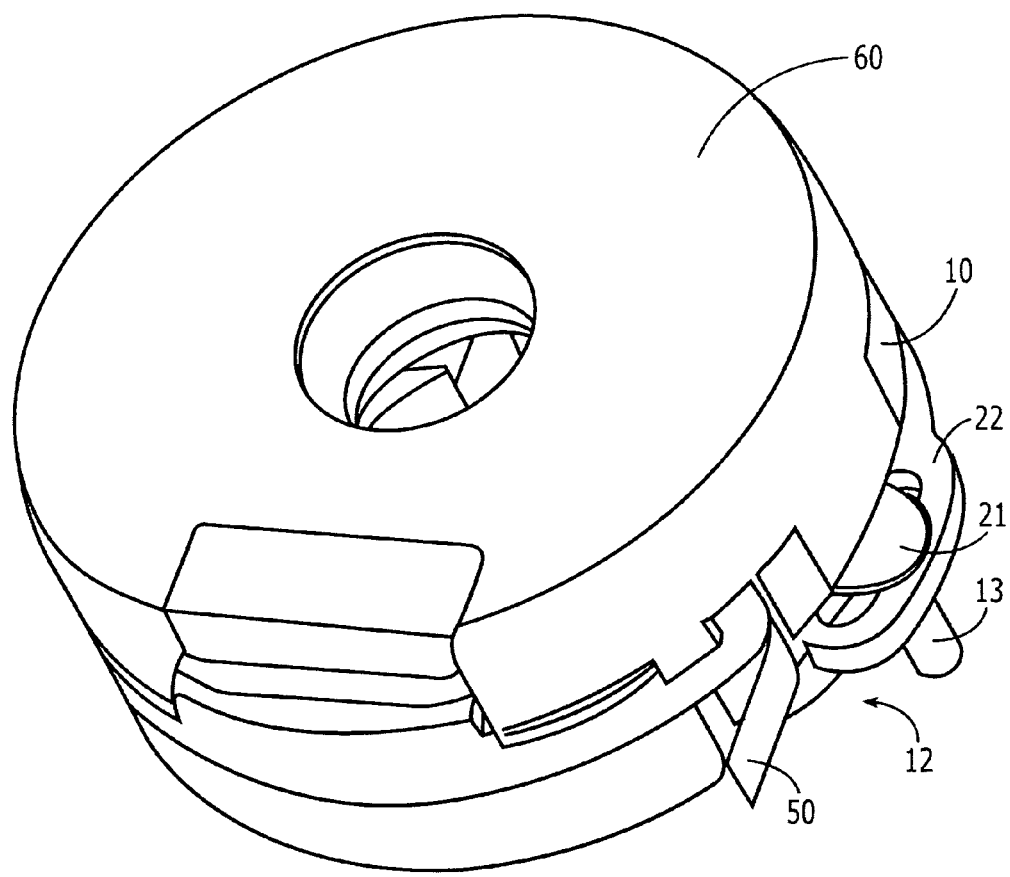
FIG. 7 is a view of an exemplary embodiment of the present invention from above and to the side.

FIG. 7 illustrates encoder housing 10 partially or completely covered by PCB cover 60 from above and to the side. Mounting screw 13 holds mounting bracket 12 in place by head 21 contacting washer contact area 22. Mounting screw 13 may attach the encoder to a motor. External tab 50 extends beyond the circumference of encoder housing 10.

Figure 8:
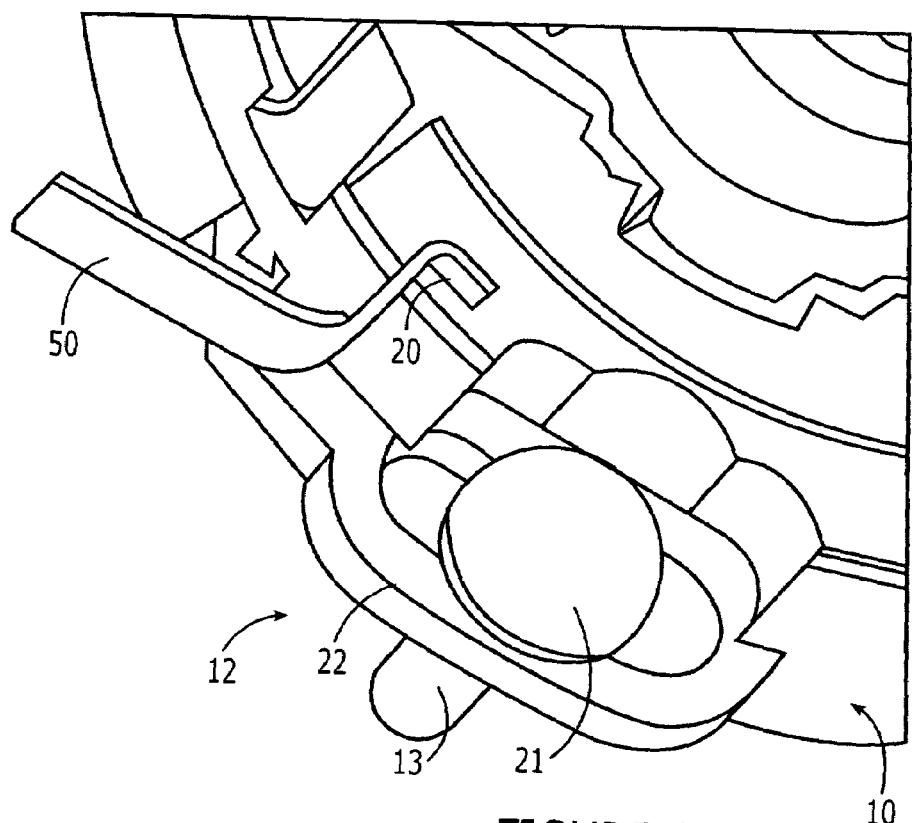
FIG. 8 is an enlarged view of an exemplary embodiment of the present invention.

FIG. 8 is an enlarged view of an exemplary embodiment of the present invention. Mounting bracket 12 is positioned in encoder housing 10. Mounting screw 13 holds mounting bracket 12 in place by head 21 contacting washer contact area 22. External tab 50 of mounting bracket 12 extends beyond the circumference of encoder housing 10. Tab 20 of mounting bracket 12 extends above the top side of encoder housing 10 where it may electrically couple to a PCB.

Figure 9:
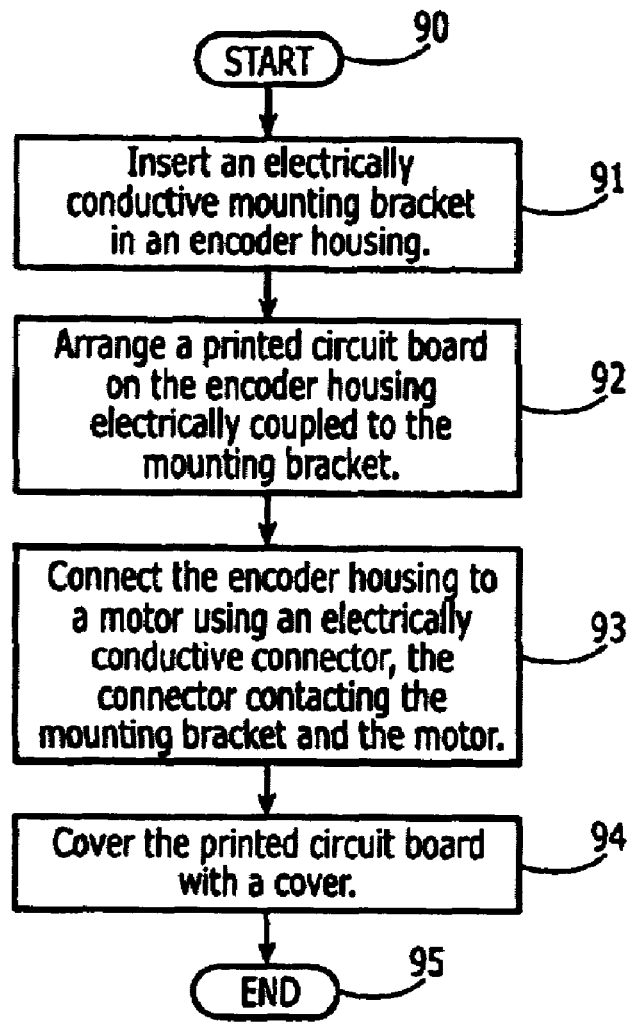
FIG. 9 is a flow chart illustrating an exemplary embodiment of a method of the present invention.

FIG. 9 is a flow chart illustrating a method of an example embodiment of the present invention. The method illustrated in FIG. 9 begins at start 90 and proceeds to action 91, which indicates to insert an electrically conductive mounting bracket in an encoder housing. From action 91, the method proceeds to action 92, which indicates to arrange a printed circuit board on the encoder housing electrically coupled to the mounting bracket. From action 92, the method proceeds to action 93, which indicates to connect the encoder housing to a motor using an electrically conductive connector. The connector contacts the mounting bracket and the motor. From action 93, the method proceeds to action 94, which indicates to cover the printed circuit board with a cover. From action 94, the method proceeds to end 95.

In an example embodiment of the present invention, the mounting bracket 12 may be integrated into an injection molded encoder housing 10, e.g., prior to injection molding of the encoder housing 10 so that the encoder housing 10 and mounting bracket 12 may be manufactured as a single part. Prior to molding of the encoder housing 10, the mounting bracket 12 may be inserted into the mold. After insertion of the mounting bracket 12 into the mold, the encoder housing 10 is then formed. Since the encoder housing 10 and mounting bracket 12 are integral, the PCB 11 may then be mounted to the encoder housing 10 without having to fix the mounting bracket 12 relative to the encoder housing 10 during mounting of the PCB 11 to the encoder housing 10.

What is claimed is:

1. A modular encoder, comprising:
    an electrically non-conductive encoder housing;
    a printed circuit board mounted in the encoder housing;
    a mounting bracket adapted to electrically couple to the printed circuit board; and
    a mounting screw adapted to couple the encoder housing to a motor and to electrically couple the mounting bracket to the motor.

2. The modular encoder according to claim 1, wherein the encoder housing includes a bracket assembly adapted to hold the printed circuit board against the mounting bracket.

3. The modular encoder according to claim 1, wherein the encoder housing is formed of a non-conductive polymer.

4. The modular encoder according to claim 1, wherein the mounting bracket is metallic.

5. The modular encoder according to claim 1, wherein the mounting bracket includes an external tab that extends outside a circumference of the encoder housing and is adapted to couple to a drain wire.

6. The modular encoder according to claim 1, wherein the mounting bracket includes a tab adapted to couple to the printed circuit board, the tab adapted to resiliently flex in response to the printed circuit board being mounted in the encoder housing.

7. The modular encoder according to claim 1, further comprising the motor.

8. The modular encoder according to claim 1, further comprising a printed circuit board cover adapted to at least partially cover the encoder housing.

9. The modular encoder according to claim 1, wherein at least one clip post is adapted to couple the printed circuit board to the encoder housing.

10. The modular encoder according to claim 9, wherein the at least one clip post is integrated into the encoder housing.

* * * * *